US005350909A

United States Patent [19]
Powell et al.

[11] Patent Number: 5,350,909
[45] Date of Patent: Sep. 27, 1994

[54] OPTICAL SCANNER FOR BAR CODE SCANNING

[75] Inventors: Kenneth E. Powell, Boca Raton; Deborah A. Mallory, Lantana, both of Fla.

[73] Assignee: International Business Machines Corp., Armonk, N.Y.

[21] Appl. No.: 960,656

[22] Filed: Oct. 14, 1992

[51] Int. Cl.⁵ .............................................. G06K 7/10
[52] U.S. Cl. .................................. 235/472; 235/462; 250/566
[58] Field of Search ................ 235/472, 462; 250/566

[56] References Cited
U.S. PATENT DOCUMENTS

| | | | |
|---|---|---|---|
| 4,818,886 | 4/1989 | Drucker | 235/472 |
| 5,091,636 | 2/1992 | Takada | 235/472 |
| 5,196,684 | 3/1993 | Lum et al. | 235/472 |

Primary Examiner—Harold Pitts
Attorney, Agent, or Firm—Bruce D. Jobse

[57] ABSTRACT

An apparatus for scanning bar code data recorded on a target includes a source emitting a beam of radiation, and optics for deflecting the beam of radiation along an axis normal to the beam. The apparatus further includes an electronic shutter element defining a plurality of adjacent regions, each region independently capable of assuming a substantially transparent state, and, digital logic, for causing the adjacent regions of the shutter element to assume substantially transparent states in a sequential, directional manner along the axis to affect directional transmission of less than all of the deflected beam onto the target. The apparatus further includes a detector for sensing the presence of radiation reflected from the target, and, optics for converting the radiation reflected from the target into a beam and for focussing the beam onto the detector.

12 Claims, 3 Drawing Sheets

OPTICAL SCANNER FOR BAR CODE SCANNING

BACKGROUND OF THE INVENTION

Commercially available bar code scanners typically utilize moving elements, such as rotating mirrors, parabolic reflectors, or the like to scan a circular beam of radiation over a bar code. As such, these scanners are susceptible to the effects of friction and wear, and often require substantial power to drive electric motors contained therein.

In addition, the size or resolution of the circular beam generated and detected by such scanners, particularly high resolution scanners, is not suitable for reading bar codes of poorer quality. It has been found that the different types of printers utilized for generation of bar codes, the roughness of the material on which the bar code is printed, and the physical condition of the printing device can cause irregularities in the bar code. Such irregularities often cause erroneous scanning, particularly where the scanning aperture is smaller than the resolution of the printer, i.e., dot-matrix printer, used to generate the bar code.

An optical scanner for bar code scanning is proposed herein that overcomes the problems associated with scanners containing moveable parts and which further is less susceptible to the variations in bar code quality.

SUMMARY OF THE INVENTION

The foregoing and other objects of the present invention are achieved with an apparatus for scanning information recorded on a target as a series of parallel lines forming a bar code, the apparatus comprising a source of a substantially circular beam of radiation, optics for deflecting the circular beam along an axis normal to the beam and for sequentially focusing adjacent portions of the deflected beam onto the target. The adjacent portions of the deflected beam have a substantially rectangular shape with a width and length, the larger of which is substantially parallel to the individual lines of the bar code. The apparatus further comprises a detector for detecting the presence of radiation reflected from the target and optics for converting the radiation from the target into a beam and for focusing the beam onto the detector.

In one embodiment, the apparatus includes an electronic shutter element defining a plurality of adjacent regions, each region independently capable of assuming a substantially transparent state. Digital logic, coupled to the electronic shutter, causes the adjacent regions of the electronic shutter to assume the substantially transparent state in a sequential, directional manner to affect directional transmission of less than all of the deflected beam onto the target.

The invention will be more fully understood from the detailed description set forth below, which should be read in conjunction with the accompanying drawings. The invention is defined in the claims appended at the end of the detailed description, which is offered by way of example only.

DETAILED DESCRIPTION OF THE INVENTION

Figure 1:
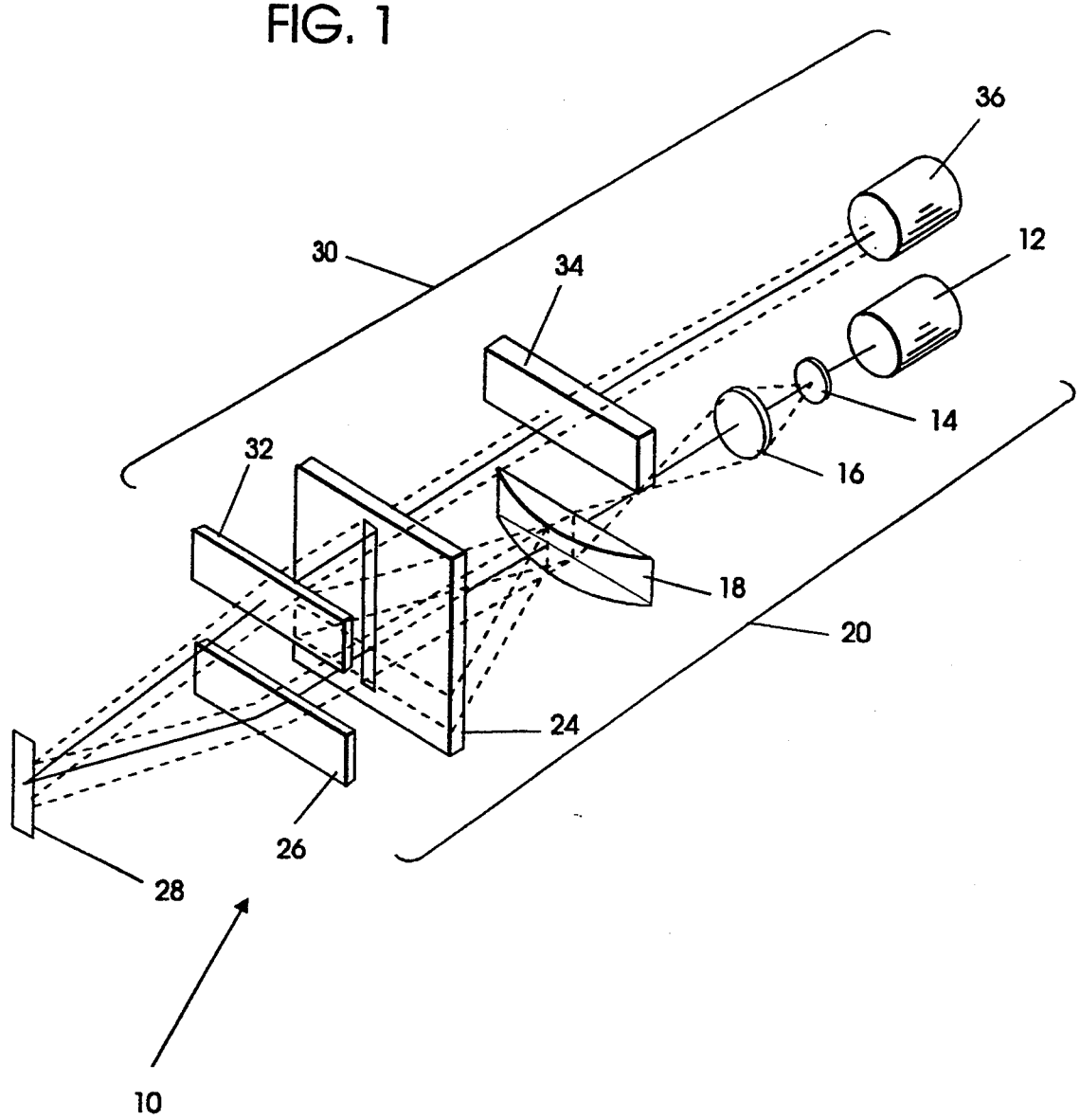
FIG. 1 is a perspective view of an optical scanner in accordance with an illustrative embodiment of the present invention.

In the various figures, the same designations are used for similar elements. Referring to the drawings and, in particular, to FIG. 1 thereof, an optical system 10 according to an illustrative embodiment of the present invention is shown. System 10 comprises, in a simple embodiment, a first plurality of elements, collectively referred to as emission path 20, and a second plurality of elements, collectively referred to as detection path 30. Emission path 20 comprises source 12, expander lenses 14 and 16, cylindrical lens 18, electronic shutter 24, and exit filter 26. The elements of emission path 20 coact to define scanning aperture 28 which moves directionally across a target area, as explained hereinafter in greater detail.

Source 12 supplies luminance to optical system 10. In the illustrative embodiment, source 12 may be implemented with any conventional device which emits radiation of a wave length suitable for use in bar code scanning applications. For example, a laser diode which emits a circular beam of radiation of approximately 1 millimeter in diameter is suitable for use in the present invention. In the various figures the beam of radiation and any accompanying fractal pattern are illustrated with both solid and dashed lines. The beam of radiation emitted by source 12 is optically coupled to cylindrical lens 18 through a set of beam expander lenses 14 and 16.

Lenses 14 and 16 expand the diameter of the beam emitted by source 12. In the illustrative embodiment, lenses 14 and 16 may be plano convex lenses and are arranged so that the emitted beam impinges on the convex surface of lens 14. Lens 14 magnifies the beam and focuses the beam onto the flat, rear surface of lens 16. Lens 16 further magnifies the beam and focuses the expanded beam onto the rear surface of cylindrical lens 18. The respective magnifications and focal lengths of lenses 14 and 16 results in a expansion of the original beam diameter by a factor of approximately five (5). It will be obvious to those reasonably skilled in the arts that lenses 14 and 16 are exemplary only. Other lens arrangements may be used to achieve beam expansion of any desired magnitude.

Cylindrical lens 18 deflects the expanded beam along a single axis only, i.e., a horizontal plane which is substantially perpendicular to the axis of the expanded beam, as illustrated in FIG. 1. The horizontal beam emitted by lens 18 is applied to the rear surface of electronic shutter 24 and may be approximately 5 millimeters in height.

Electronic shutter 24 selectively passes portions of the expanded, horizontal beam. In the illustrative embodiment, electronic shutter 24 is a liquid crystal assembly which includes a plurality of adjacent areas or windows which may be electrically activated to assume either an opaque or transparent state, in sequence, to effect directional scanning of a select portion of the horizontal beam, as explained in greater detail hereinafter. The locations and status of the windows within electronic shutter 24 define which portion of the horizontal beam is transmitted through shutter 24 and, ultimately, the position of scanning aperture 28. In the illustrative embodiment, shutter 24 has a plurality of rectangular windows which transmit a substantially vertical, rectangular beam having a height greater than width. The portion of the rectangular beam transmitted through electronic shutter 24 impinges on the rear surface of exit filter 26.

Exit filter 26 controls the power and angle of the emitted beam. In the disclosed embodiment, filter 26 is a neutral density optical filter which controls the power output of emission path 20. Accordingly, the different power specifications of various applications and code classes may be accommodated by selecting the proper density of filter 26. The exit surface of filter 26 is angled to deflect the rectangular beam emitted by the filter upward toward the target area (not shown). As a result, the rectangular beam impinges on the target area of the bar code at an upward angle, and, the radiation deflected from the target area is reflected at a corresponding angle, allowing emission path 20 and detection path 30 to be vertically stacked, as explained hereinafter.

Since beam expansion is employed in the emission path 20, the angle at which the beam is deflected by exit filter 26 and the focal points of the elements within the emission path 20 are not critical.

The deflected beam strikes the target area (not shown) over a generally rectangular area, designated generally as scanning aperture 28, and excites that portion of the target. The portion of the beam reflected from the target enters detection path 30 through entry filter 32, as illustrated. Detection path 30 collectively comprises entry filter 32, electronic shutter 24, fresnel lens 34, and detector 36. Electronic shutter 24 is a part of both the emission path 20 and the detection path 30, as explained in greater detail hereinafter.

Entry filter 32 receives the beam reflected from the target and deflects and filters the reflected beam. Filter 32 in the disclosed embodiment, may be a band pass optical filter, which selectively passes only those frequencies of radiation of interest and filters out those frequencies not of interest, i.e. ambient light. The entry surface of filter 32 is angled an amount equal to the deflection angle of exit filter 26. Accordingly, the portion of the reflected beam entering entry window 32 is deflected back along a horizontal axis and is transmitted toward the front surface of electronic shutter 24, as illustrated in FIG. 1.

Since electronic shutter 24 is disposed within both emission path 20 and detection path 30, the same window which provided an emission path from cylindrical lens 18 to exit filter 26, also provides a reception path from entry filter 32 to fresnel lens 34, as illustrated. Emission path 20 and detection path 30 are optically isolated from each other by a baffle 44, illustrated in FIG. 3, to prevent cross talk between the two paths, as explained hereinafter. Electronic shutter 24 is disposed within an aperture in the baffle so that the upper portion of the currently activated window is disposed within the detection path 30 while the lower portion of the currently activated window is disposed within the emission path. Referring again to FIG. 1, the portion of the reflected beam transmitted through electronic shutter 24, impinges on the front surface of fresnel lens 34.

Fresnel lens 34 focuses the reflected beam on detector 36, regardless of where the returning beam strikes lens 34. Accordingly, the focal point of the reflected beam remains on detector 36 regardless of which window within electronic shutter 24 is activated.

Detector 36 converts the reflected beam into an electrical signal. In the illustrative embodiment, detector 36 may be any conventional detector suitable for use with the intensity and wave lengths of radiation emitted by source 12. For example, detector 36 may be implemented with a photo diode, the output of which is relative to the amount of radiation received at its entry lens. The output of detector 36 is typically amplified and supplied to an appropriate logic for decoding and transmission.

Figure 2A:
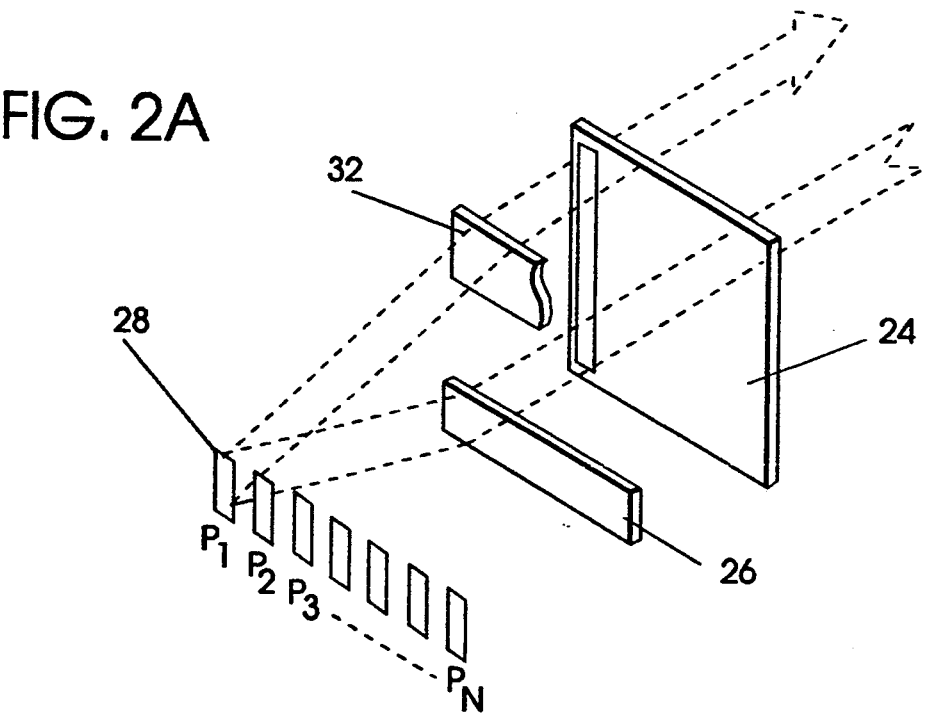
FIGS. 2A-B are partial, perspective, views of the optical emission and detection path, respectively, of the optical scanner of FIG. 1.
Figure 2B:
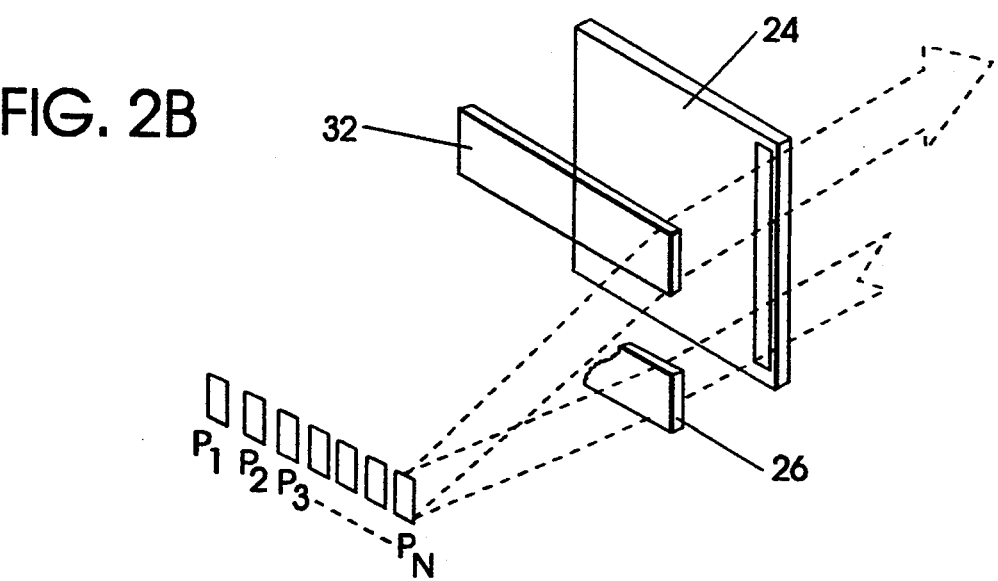

Having described the emission and detection paths of optical system 10, the construction and function of electronic shutter 24 is described in greater detail. Referring now to FIGS. 2A and 2B, in the illustrative embodiment, electronic shutter 24 is implemented with a liquid crystal assembly having a plurality of window elements which form opaque, vertical bars is one state, and, which become transparent in another state. It is within the scope of one reasonably skilled in the arts how shutter 24 would be constructed. FIG. 2A illustrates conceptually the time elapsed positions, P1−n, of scanning aperture 28 as it moves directionally across a target area, for a shutter 24 having n window elements. In operation, the scanning process is started by activating the first window element of the shutter, thereby allowing the beam to pass through shutter 24, filter 26, and strike the target area, as illustrated. The reflected portion of the beam enters filter 32 and is retransmitted through the same window element of shutter 24 for subsequent detection. Upon deactivation or closure of the first window element, the adjacent window element is activated or opened, allowing the adjacent portion of the beam to excite the next most adjacent portion of the target area. The sequence of opening and closing adjacent window elements within the shutter continues from the first window element, as illustrated in FIG. 2A, to the nth window element, as illustrated in FIG. 2B. This excitation of the target continues until the data of the bar code is recognized or until some other predetermined condition occurs.

Electronic shutter 24 may be activated by timing and control signals from a digital processor. Alternatively, shutter 24 may be activated with control signals from hard wired logic, such as a decade counter or the like. It will be obvious to those reasonably skilled in the art that numerous ways exist to create the appropriate timing and control signals to activate, in sequence, the window elements within shutter 24 to affect directional scanning of the target area.

Scanning aperture 28, as illustrated in FIGS. 1 and 2A-B, is characterized by a vertical bar having a greater height than width. For example, the height of the aperture may be approximately 0.025" and the width may be 0.005". The aperture strikes the target area so that the longer axis of the aperture is substantially parallel to the lines comprising the bar code data. As such, the large sampling in the plane parallel to the lines of the bar code allows for averaging of edge values within the scan aperture and thereby eliminates any modulation problems. This technique further allows for averaging of light and dark spots in the bar code, thereby overcoming the problems associated with current bar code scanners, as explained in U.S. patent application Ser. No. 07/952,395, entitled "An Improved Optical Wand for Bar Code Scanning," filed on Sep. 28, 1992 by the same inventors, the disclosure of which is incorporated herein in its entirety by reference.

Figure 3:
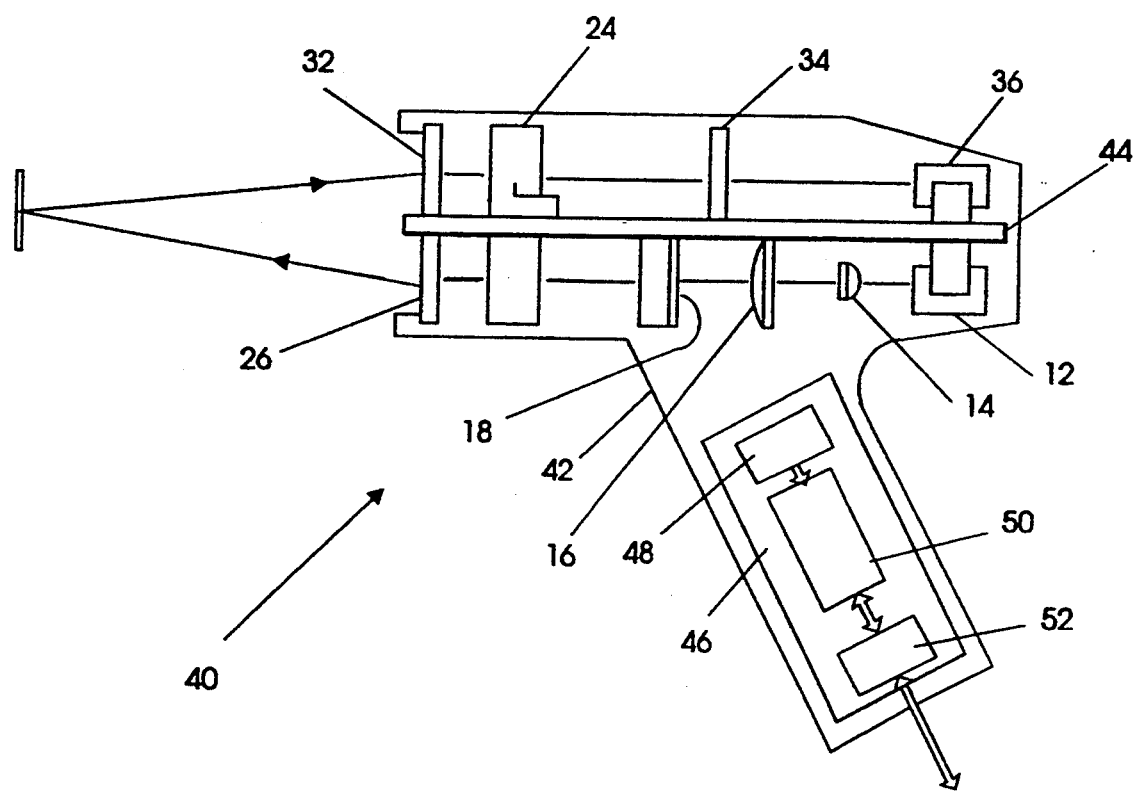
FIG. 3 is a side, cut-away view of the optical scanner of FIG. 1 illustrating a more complete embodiment.

Referring to FIG. 3, there is shown a schematic representation, in partial section, of the inventive concept embodied in a hand-held scanner, designated generally as 40. Scanner 40 comprises housing 42, baffle 44, circuit board 46, activation circuitry 48, microprocessor 50 and interface circuitry 52, as well as emission path 20 and detection path 30. The function and arrangement of the elements of paths 20 and 30 in scanner 40 are similar to that previously described.

Housing 42 encloses the elements of scanner 40 and optically shields optical system 10 from the external environment. Housing 42 may be made of a substantially rigid material to protect the components of the scanner from damage. In the illustrative embodiment, housing 42 has a shape which includes a handle grip area for ease of hand-held use. The upper portion of housing 42 is divided into upper and lower chambers by a baffle 44 which optically isolates the emission path 20 from detection path 30 and prevents cross talk between the two. The elements of paths 20 and 30 may be mounted to baffle 44 and/or housing 42 by means not shown. In the illustrated embodiment, baffle 44 may comprise a printed circuit board on which some or all components of optical system 10 may be mounted. As stated previously, electronic shutter 24 is disposed within an aperture in baffle 44 so that the shutter upper portion is disposed within detection path 30 while the shutter lower portion is disposed with emission path 20.

In the illustrative embodiment, a microprocessor 50 is utilized to control operation of scanner 40. Processor 50 controls such functions as decoding and formatting of the output signal of detector 36, timing and control of electronic shutter 24, and initialization of scan cycles. Microprocessor 50 may perform other functions such as controlling indicators, both audio and visual, to convey status of the scanner to a user. Processor 50 may reside on circuit board 46, as illustrated, or on baffle 44, if the baffle is implemented as a printed circuit board. A separate decoder chip or logic can be provided on circuit board 46, if decode functions are not performed by microprocessor 50.

Scanner 40 may be activated by any number of conventional apparatus such as a manual trigger, or a mercury switch which automatically initiates scanning when the physical orientation of housing 42 is changed, i.e. removed from or placed into a retaining holster. Such activation circuitry is indicated generally by block 48 and is within the scope of those reasonably skilled in the art.

Scanner 50 may further comprise amplification circuitry for appropriately amplifying the output of detector 36 prior to its decoding and processing by microprocessor 50, such circuitry again being within the scope of those skilled in the arts and not shown for simplicity.

Interface circuitry, shown generally in FIG. 3 by block 52, may comprise a socket which is electrically coupled with microprocessor 50. It is contemplated within the present invention to provide various data formatting microroutines within microprocessor 50 so that the real-time output of the scanner 40 may be formatted to emulate numerous interfaces, such as wands, keyboard/mouse ports, serial interfaces, parallel interfaces, and radio frequency (RF) links. In this manner, when a data processing system is interfaced with microprocessor 50 via interface circuitry 52, and typically a cable having a plurality of pins, the processor detects which pin signals are present and determines which microroutine is necessary to format the output signal for the device to be emulated. This design eliminates the need to have a different scanner design for interfacing with each of a keyboard port, a serial interface, a parallel interface, etc. The control programs necessary for microprocessor 50 to function as described herein are stored within microprocessor 50, or an associated memory, and are within the scope of those reasonably skilled in the arts.

The inventive optical scanner described above, does not utilize moving parts which characterize the problematic prior art scanners. Since the present invention is free of moving parts, particularly electrical motors, the power consumption of the inventive scanner is substantially lower. In the embodiment shown in FIG. 3, scanner 40 typically receives electrical power through a cable coupled to interface circuitry 52. As a variation to that embodiment, scanner 40 may be battery powered, with the output of the scanner being transmitted to a data processing system through an RF transmitter. The construction and design of such a battery power supply and RF transmission device being well within the scope of those reasonably skilled in the art.

Since the optical scanner described herein does not utilize moving parts, it is likely to have a mean time between failure which is likely to exceed that of commercially available scanners which, because of their moveable parts, are susceptible to misalignment and require frequent adjustment of the optical elements.

The above described scanner combines optical, mechanical and electrical components into an apparatus which is easily manufactured and which can be more accurate and reliable, consume less power, and have a broader array of interface possibilities than current commercially available scanners.

Accordingly, it will be appreciated that the detailed disclosure has been presented by way of example only and is not intended to be limiting. Various alterations, modifications and improvements will readily occur to those skilled in the art, and may be practiced without departing from the spirit and scope of the invention. For example, in the illustrative embodiment, since the emission and detection paths are vertically stacked, a single electronic shutter is simultaneously disposed in both paths. It will be obvious to those reasonably skilled in the art that two electronic shutters operating synchronously could be used to achieve the same effect, or, that the shutter may be eliminated from detection path 30. The invention is limited only as required by the following claims and equivalence thereto.

What is claimed is:

1. An optical scanner for scanning bar code data comprising:
    a) a source of a beam of radiation;
    b) optical means for deflecting the beam of radiation along an axis normal to the beam;
    c) an electronic shutter element, optically coupled with the optical means, said shutter element defining a plurality of adjacent regions, each region independently capable of assuming a substantially transparent state;
    d) digital logic, coupled to said shutter element, for causing said adjacent regions of said electronic shutter to assume said substantially transparent state, in a sequential, directional manner along said axis to affect directional transmission of less than all of the deflected beam onto the target;

e) a detector for detecting the presence of radiation reflected from the target;

f) second optical means, optically coupled to the detector, for converting the radiation reflected from the target to a beam and for focusing the beam on the detector; and g) a baffle optically isolating the detector from the source, said baffle further optically partitioning each of said plurality of regions of the electronic shutter element into an emission subregion and a detection subregion to affect simultaneous transmission through one of said regions the deflected beam toward the target and said reflected radiation toward said detector.

2. The apparatus of claim 1 wherein
said detector converts detected radiation into electrical signals; and
said apparatus further in combination with decoding logic, responsive to said detector, for processing said electrical signals.

3. The apparatus of claim 2 wherein said digital logic and decoding logic comprise a microprocessor.

4. An apparatus for scanning bar code data records on a target, the apparatus comprising:

a) a source emitting a substantially circular beam of radiation;

b) beam expander optics, optically coupled to the source, for expanding the diameter of the circular beam;

c) a cylindrical lens, optically coupled with said beam expander optics, for deflecting the expanded beam along an axis normal to the expanded beam;

d) an electronic shutter element, optically coupled to the cylindrical lens, said shutter element defining a plurality of adjacent regions, each region independently capable of assuming a substantially transparent state;

e) a digital processor, coupled to said electronic shutter, for causing said adjacent regions of the electronic shutter to assume said substantially transparent state in a sequential, directional manner along said axis, to affect directional transmission of less than all of the deflected beam onto the target;

f) bending optics, optically coupled with said electronic shutter, for focusing less than all the deflected beam onto the target;

g) filter optics responsive to radiation reflected from the target;

h) a detector responsive to the presence of radiation reflected from the target and for converting radiation detected into electrical signals;

i) decode logic, responsive to said detector, for processing said converted electrical signals;

j) means, optically coupled with said filter optics, for converting the radiation received by the filter optics to a beam, and for focusing the beam onto the detector; and k) a baffle optically isolating the detector from the source, said baffle further optically partitioning each of said plurality of regions of the electronic shutter element into an emission subregion and a detection subregion to affect simultaneous transmission through one of said regions the deflected beam toward the target and said reflected radiation toward said detector.

5. The apparatus of claim 4 wherein said electronic shutter element comprises a liquid crystal display assembly having a plurality of adjacent rectangular regions which are independently capable of assuming either a substantially transparent state or a substantially opaque state.

6. The apparatus of claim 4 wherein said digital processor and said decode logic comprise a microprocessor.

7. The apparatus of claim 4 wherein said source emits laser radiation.

8. The apparatus of claim 5 wherein said source emits infrared radiation.

9. The apparatus of claim 4 wherein said beam expansion optics expand the diameter of said substantially circular beam of radiation by at least a factor of five.

10. The apparatus of claim 1 wherein said electronic shutter element comprises a liquid crystal display assembly having a plurality of adjacent rectangular regions which are independently capable of assuming either a substantially transparent state or a substantially opaque state.

11. The apparatus of claim 1 wherein said source emits laser radiation.

12. The apparatus of claim 1 wherein said source emits infrared radiation.

* * * * *